United States Patent
Kang (10) Patent No.: US 7,460,552 B2
(45) Date of Patent: Dec. 2, 2008

(54) METHOD FOR MANAGING A GROUP IN A STAR NETWORK AND APPARATUS USING THE METHOD

(75) Inventor: Mun-hyuk Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 980 days.

(21) Appl. No.: 10/337,871

(22) Filed: Jan. 8, 2003

(65) Prior Publication Data

US 2003/0128713 A1 Jul. 10, 2003

(30) Foreign Application Priority Data

Jan. 8, 2002 (KR) .................................. 2002-986

(51) Int. Cl.
*H04L 12/56* (2006.01)
*H04L 12/413* (2006.01)
*H04J 1/00* (2006.01)
*H04J 15/00* (2006.01)
*H04H 20/71* (2008.01)

(52) U.S. Cl. ....................... 370/425; 370/484; 370/312; 370/446

(58) Field of Classification Search ....................... None
See application file for complete search history.

(56) References Cited

U.S. PATENT DOCUMENTS

| 5,594,948 | A | * | 1/1997 | Talarmo et al. ............. 455/518 |
| 6,028,866 | A | * | 2/2000 | Engel et al. .................. 370/461 |
| 6,269,080 | B1 | * | 7/2001 | Kumar ........................ 370/236 |
| 6,275,500 | B1 | | 8/2001 | Callaway, Jr. et al. |
| 6,738,639 | B1 | * | 5/2004 | Gosselin ..................... 455/519 |
| 6,856,591 | B1 | * | 2/2005 | Ma et al. ..................... 370/216 |
| 6,999,783 | B2 | * | 2/2006 | Toyryla et al. .............. 455/519 |
| 7,031,294 | B2 | * | 4/2006 | Aiello et al. ................. 370/348 |
| 2001/0022780 | A1 | * | 9/2001 | Mizutani et al. ............ 370/261 |

FOREIGN PATENT DOCUMENTS

JP 8/79247 A 3/1996

(Continued)

OTHER PUBLICATIONS

First Office Action for Chinese Patent Application No. 200510108828X, Jun. 29, 2007, and partial English language translation of same.

*Primary Examiner*—Kwang B. Yao
*Assistant Examiner*—Warner Wong
(74) *Attorney, Agent, or Firm*—Sughrue Mion, PLLC (57) ABSTRACT

A method for managing a group of communication terminals making up a star network, and an apparatus using the method are provided. The star network may be made up of at least one general communication terminal and a central communication terminal controlling the whole network. The method provides requesting the central communication terminal to establish a communication channel for managing a group and having a communication channel established for managing a group by the central communication terminal, receiving group information of a group which includes a predetermined terminal of the general communication terminal or a central communication terminal, and storing the group information. Therefore, it is possible to create and manage a group of communication terminals based on each application function in a star network. In addition, communication between communication terminals in the same group can be performed smoothly.

29 Claims, 7 Drawing Sheets

FOREIGN PATENT DOCUMENTS

| | | |
|---|---|---|
| JP | 10-257064 A | 9/1998 |
| JP | 10-336745 A | 12/1998 |
| JP | 2001-346267 A | 12/2001 |
| KR | 1999-0079422 A | 11/1999 |
| KR | 2001-0058738 A | 7/2001 |

* cited by examiner

| GROUP ID | NUMBER OF MEMBERS | APPLICATION ID SUPPORTED BY GROUP | APPLICATION FUNCTION PROCESS POINTER SUPPORTED BY GROUP |
|---|---|---|---|
| CHAT001 | 2 | GA1 | 1 |
| ... | ... | ... | ... |

FIG. 3

| GROUP ID | MEMBER ID |
|----------|-----------|
| CHAT001  | S1        |
| ...      | ...       |

FIG. 4

| TERMINAL ID | APPLICATION ID PROVIDED BY TERMINAL |
|-------------|-------------------------------------|
| S1          | GA1                                 |
| ...         | ...                                 |

METHOD FOR MANAGING A GROUP IN A STAR NETWORK AND APPARATUS USING THE METHOD

BACKGROUND OF THE INVENTION

1. Field of the Invention

The present invention relates to a method for managing a group of a plurality of communication terminals making up a star network, and an apparatus using the method. The present application is based on Korean Patent Application No. 2002-986, filed Jan. 8, 2002, which is incorporated herein by reference.

2. Description of the Related Art

In a conventional star network, a method for grouping communication terminals or a method for managing communication groups and an apparatus using the method are not provided in detail. For example, Bluetooth, a technology used for a type of star network, provides only a principle of grouping through L2CAP (logical link control and adaptation protocol) without a method or a process for creating a group of the communication terminals in detail. Accordingly, it is impossible to group and manage the communication terminals in the star network, and to provide a user with a variety of additional services.

SUMMARY OF THE INVENTION

It is an object of the present invention to provide a method for managing group information in a communication terminal and a central communication terminal making up a star network.

It is another object of the present invention to provide a communication terminal making up a part of a star network.

In an aspect, the present invention provides a method for managing group information in a communication terminal of a star network made up of at least one general communication terminal and a central communication terminal controlling the whole network, the method comprising: (a) requesting the central communication terminal to establish a communication channel for managing a group; and (b) having a communication channel established for managing a group by the central communication terminal, receiving and storing group information.

In addition, the method for managing group information in a communication terminal further comprises: (c) registering an application function which can be provided by the communication terminal, providing the registered application function information to the central communication terminal, and registering the application function information of other communication terminals provided by the central communication terminal; (d) selecting another communication terminal providing the same application function as the application function of the communication terminal and requesting the central communication terminal to group the selected other communication terminal and the communication terminal; and (e) receiving updated information from the central communication terminal updating the group information according to the request and storing the updated information. The step of (d) is characterized by selecting a group which is included in the group information and requesting the central communication terminal to include the communication terminal in the selected group.

Also, the method for managing group information of a communication terminal comprises the steps of (a), (b), and further: (f) selecting a group wherein the communication terminal is included, based on the group information, and requesting the central communication terminal to eliminate the communication terminal from the selected group; and (g) receiving the updated group information from the central communication terminal updating the group information according to the request. The step of (f) is characterized by requesting the central communication terminal to eliminate a group wherein the communication terminal is included, if the group information is included in a group of the communication terminal.

In one aspect, the present invention provides a method for managing group information of a central communication terminal in a star network made up of at least one general communication terminal and a central communication terminal controlling the whole network, the method comprising: (a) receiving a request to establish a communication channel for managing a group from the general communication terminal; and (b) establishing a communication channel for managing a group and transmitting the group information stored by the central communication terminal to the general communication terminal.

In addition, the method for managing group information of a central communication terminal comprises the steps of (a), (b), and further: (c) receiving information of an application function which can be provided by the central communication terminal, from the general communication terminal, storing the application function information, and transmitting an application function of other general communication terminals other than the general communication terminal, to the general communication terminal; (d) receiving a request to group together the central communication terminal and another communication terminal selected by the general communication terminal, grouping the general communication and the other communication terminal and updating the group information; and (e) transmitting the updated group information to the general communication terminal and the other communication terminal. The step of (d) is characterized by grouping the general communication terminal and the other communication terminal, and updating the group information only when the application function of the general communication terminal is the same as the application function of the other communication terminal. Also, the step of (d) is characterized by receiving a request to include the general communication terminal in a group included in the group information and updating the group information according to the request.

The method for managing group information of a central communication terminal further comprises: (f) receiving a request to secede from a predetermined group from the communication terminal; and (g) updating the group information according to the request and transmitting the updated group information to the communication terminal. The step of (f) is characterized by receiving a request from the communication terminal to disorganize a predetermined group wherein the communication terminal is included, updating the group information according to the request and transmitting the updated group information to the communication terminal.

In another aspect, the present invention provides a communication method for a star network made up of at least one general communication terminal and a central communication terminal controlling the whole network, the communication method comprising: (a) the communication terminal receiving group information from the central communication terminal and storing the received group information; and (b) the communication terminal selecting from the group information at least one communication terminal of other communication terminals which are included in the same group as the communication terminal, and transmitting data to the selected communication terminal.

In addition, the communication method comprises the steps of (a), (b), and further: (c) the communication terminal, which receives the data, determining if its own terminal is included in a destination of the data; and (d) if the communication terminal is determined to be included in the destination, the communication terminal executing a predetermined application function to process the data and providing the executed application function with the data. The step of (c) further comprises: (c1) the central communication terminal, which receives the data, extracting information of a communication terminal to be a destination receiving the data; and (c2) if another communication terminal other than the central communication terminal is included in the extracted information, the central communication terminal re-transmitting the data to the other communication terminal.

In another aspect, the present invention provides a communication terminal comprising: a transmitting/receiving portion which transmits or receives necessary information to and from other communication terminals; a management portion of application function information which registers application information which the communication terminal can provide, receives, through the transmitting/receiving portion, and stores information relating to an application function to be provided by other communication terminals; a management portion of group information which creates, receives, through the transmitting/receiving portion, and stores information on a predetermined group of predetermined communication terminals; an application function execution portion which receives data from the same group as the communication terminal and executes an application program which provides an application function characterizing the group; an input/output portion which provides the received data by indicating the data and has necessary information inputted.

In addition, the communication terminal further comprises a data relay portion which re-transmits data received from a predetermined communication terminal to other communication terminal, if the destination includes the other communication terminals.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
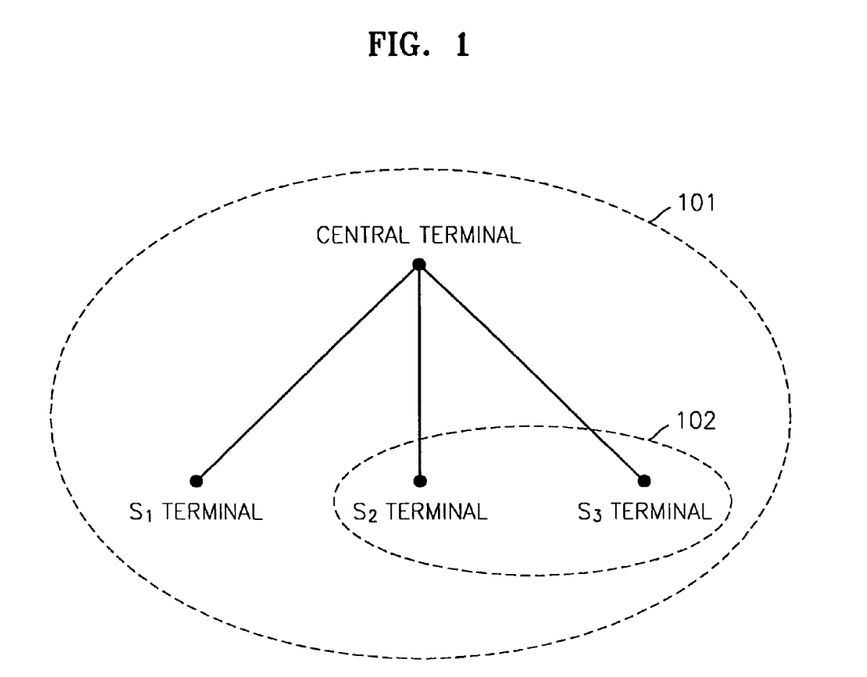
FIG. 1 is a view of a preferred embodiment of constructing a group in a star network according to the present invention.

The present invention will now be described more fully with reference to the accompanying drawings, in which preferred embodiments of the invention are shown. FIG. 1 shows a preferred embodiment of a group in a star network according to the present invention. Reference numeral 101 denotes the whole network. The star network comprises general communication terminals S1, S2, and S3, and a central communication terminal which is connected to the general communication terminals and controls the network. Reference numeral 102 denotes an example of grouping the general communication terminals S2 and S3. This group comprises communication terminals having the same application functions provided to a user.

Figure 2:
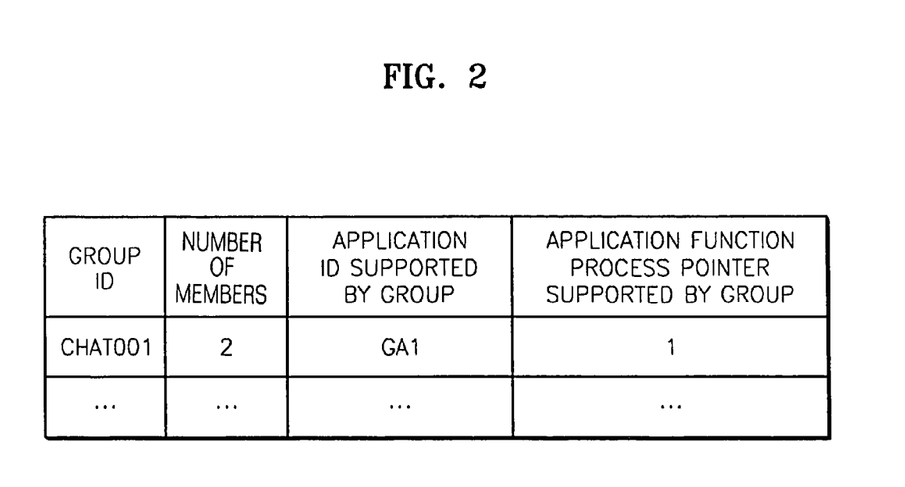
FIG. 2 is a view of a preferred embodiment of a table structure for managing group information in each communication terminal making up a part of a star network according to the present invention.

FIG. 2 shows a preferred embodiment of a table structure for managing group information in each communication terminal making up a part of a star network according to the present invention. The group information comprises an unique ID for identifying a group (Group ID), a number of communication terminals included in the group (a number of members), an ID of application functions supported by the group (Application ID) and location information on a pointer of an application program (pointer of an application function process) for performing the application functions in each communication terminal.

In the meantime, the table is managed by all communication terminals (i.e., the central communication terminal and the general communication terminal) making up a star network according to the present invention.

Figure 3:
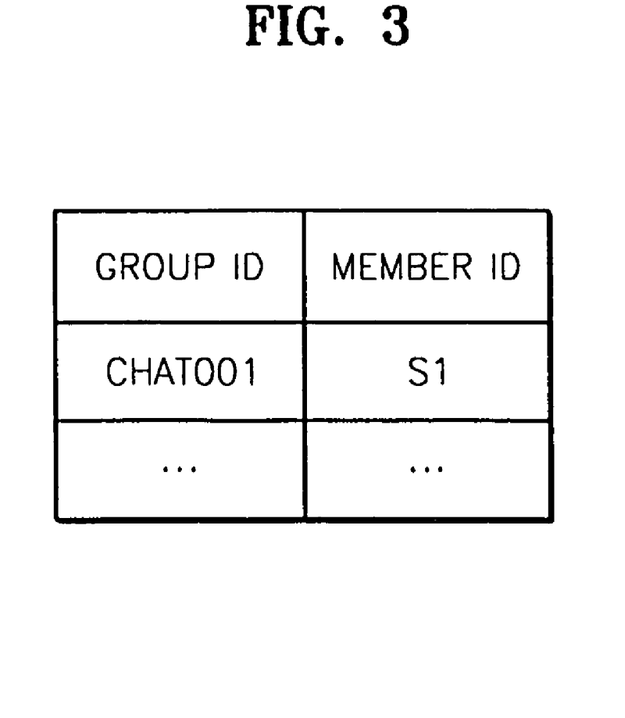
FIG. 3 is a view of a preferred embodiment of a table structure for managing information on members of the group managed in the group information of FIG. 2.

FIG. 3 shows a preferred embodiment of a table structure for managing information on members of the group managed in the group information of FIG. 2. The information managed in the table of FIG. 3 is a Group ID and an ID of a communication terminal making up a part of the group (Member ID). The Member ID can be an unique code assigned previously to each communication terminal.

Figure 4:
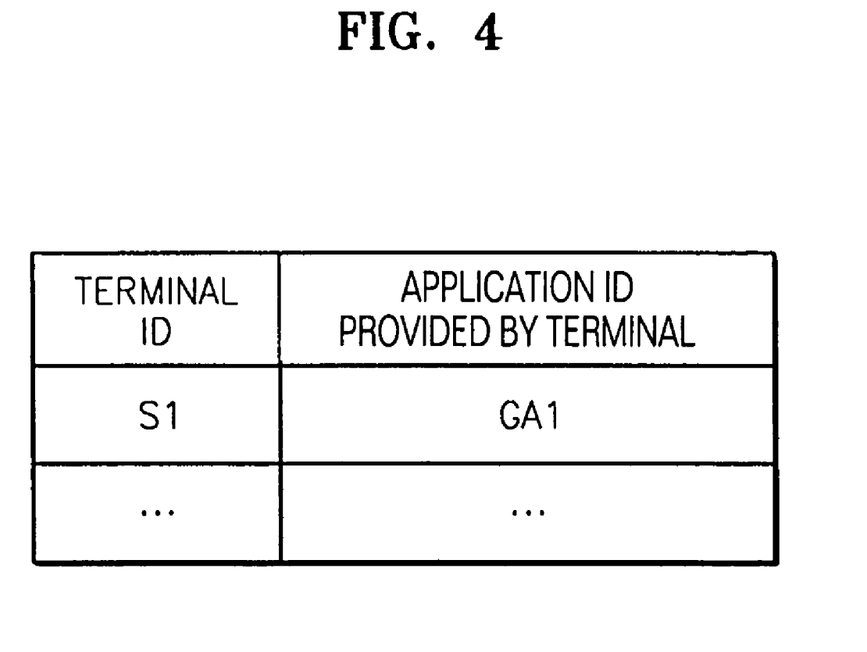
FIG. 4 is a view of a preferred embodiment of a table structure for managing list information of application functions provided by each communication terminal according to the present invention.

FIG. 4 shows a preferred embodiment of a table structure for managing list information of application functions provided by each communication terminal according to the present invention. The information managed in the table of FIG. 4 consists of an ID of a communication terminal connected to the star network according to the prevent invention, i.e., a Terminal ID, and an ID of application functions provided by the terminal, i.e., an Application ID provided by the communication terminal. The Application ID provided by a communication terminal can be assigned previously based on each application function.

Figure 5:
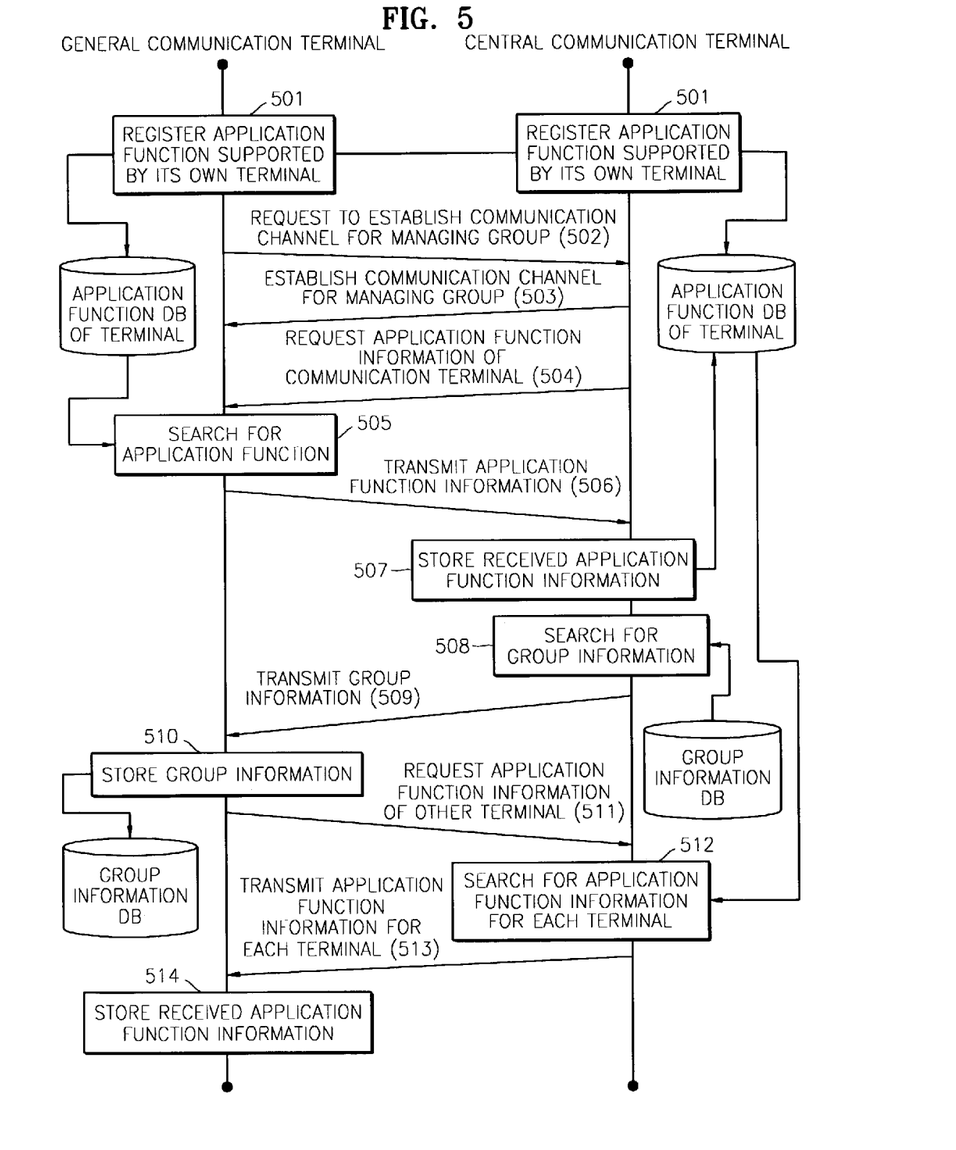
FIG. 5 is a view of a preferred embodiment of initializing the group information in each communication terminal of a star network according to the present invention.

FIG. 5 shows a preferred embodiment of initializing the group information in each communication terminal of a star network according to the present invention. Upon being turned on, each general communication terminal and central communication terminal registers an application function supported by them in the table having application functions (step 501) and stores the application function in an application function database. Each general communication terminal requests the central communication terminal to establish a communication channel for managing a group (step 502). Then, the central communication terminal establishes the communication channel for managing a group for the general communication terminal (step 503) and requests a list information of application functions which can be provided by each communication terminal (step 504). The general communication terminal searches for application function information stored in its table of application functions (step 505) and transmits the application function information to the central communication terminal (step 506). The central communication terminal stores the application function information in its application function database (step 507). Then, the central communication terminal searches for group information of FIGS. 2 and 3 from its group information database (step 508) and transmits the group information to the general communication terminal (step 509). Then, the general communication terminal stores the group information (step 510).

In the meantime, the general communication terminal can request the application function information of another terminal from the central communication terminal (step 511). Then, the central communication terminal can search for the application function information of another communication terminal other than the general communication terminal by searching an application function database (step 512), and transmit the application function information of another communication terminal to the general communication terminal (step 513). Then, the general communication terminal stores the transmitted application function information (step 514).

Figure 6:
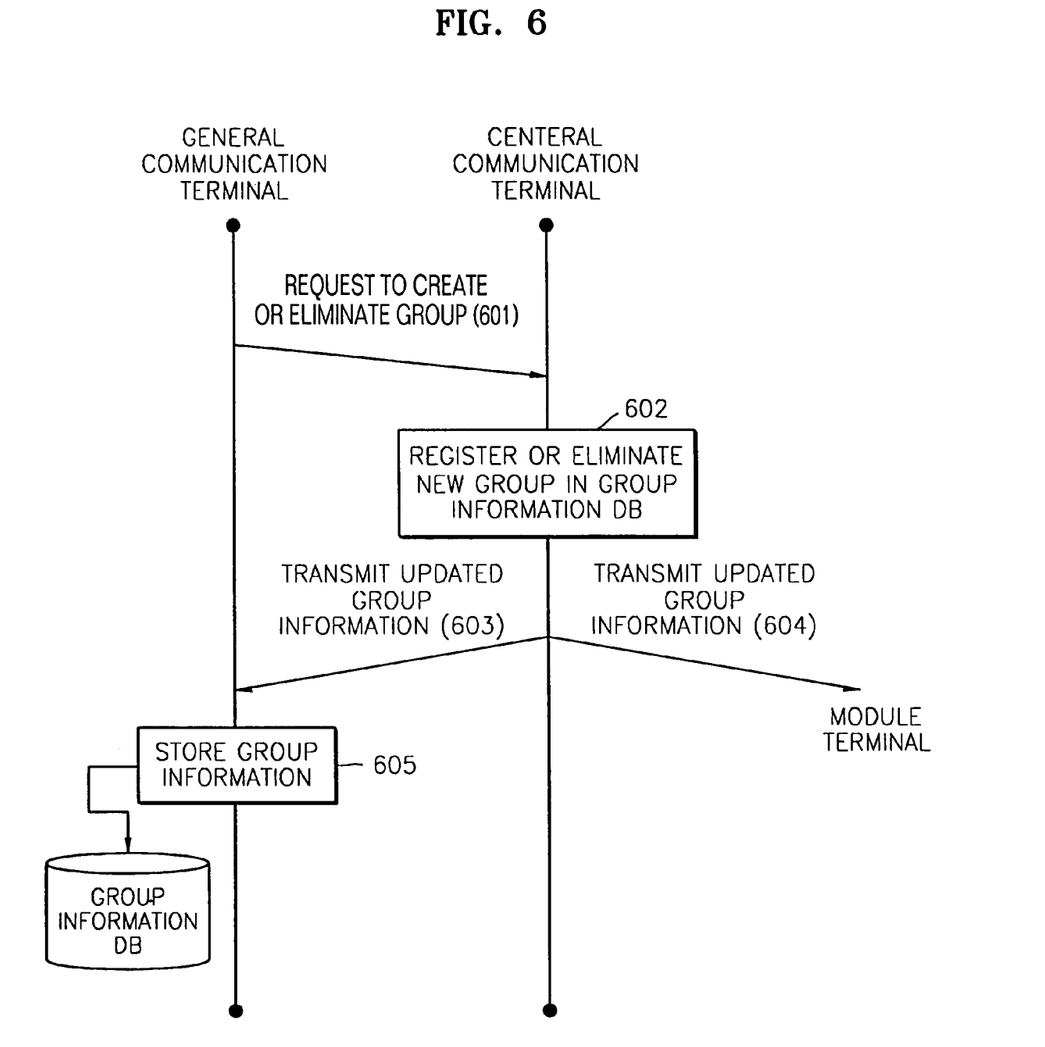
FIG. 6 is a view of a preferred embodiment of a process to create or eliminate a group including a predetermined communication terminal in a star network according to the present invention.

FIG. 6 shows a preferred embodiment of a process to create or eliminate a group including a predetermined communication terminal in a star network according to the present invention. At first, the general communication terminal requests the central communication terminal to create a new group which includes the general communication terminal or eliminate an existing group which includes the general communication terminal (step 601).

The request to create a new group is directed to the central communication terminal to create the new group of the general communication terminal and another communication terminal by selecting at least one communication terminal which provides the same application function as the general communication terminal, from the application function table shown in FIG. 4. Further, the request to disorganize (or eliminate) a group is directed to the central communication terminal to disorganize or eliminate by selecting one of the groups in which the general communication terminal is included, from the table of members of FIG. 3.

The central communication terminal receiving the above requests registers the group information of FIGS. 2 and 3 as a new group or eliminates the group information according to the requests (step 602). At this time, a user performs a standard process for inputting the above requests to the central communication terminal and the central communication terminal can accept or reject the requests based on the standard process.

Then, the central communication terminal transmits information of the table for managing the updated group information of FIGS. 2 and 3, to the general communication terminal requesting the above requests (step 603). Further, the central communication terminal can transmit the updated group information to another general communication terminal other than the requesting general communication terminal (step 604).

The general communication terminal stores the transmitted group information in a group information database (step 605).

Figure 7:
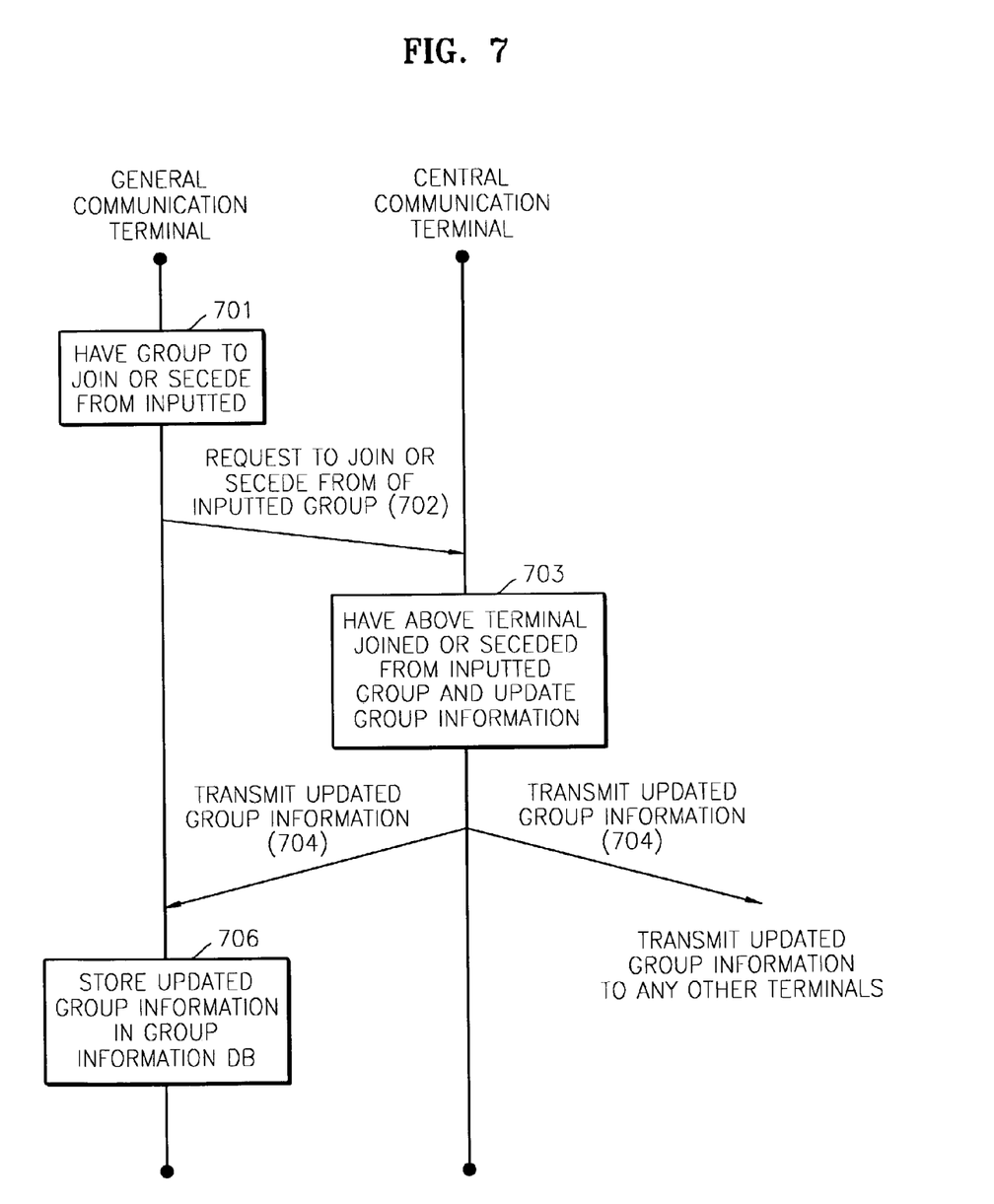
FIG. 7 is a view of a preferred embodiment of a process for a predetermined communication terminal to join a group created previously in a star network, as a member, according to the present invention.

FIG. 7 shows a preferred embodiment of a process for a predetermined communication terminal to join a group created previously in a star network, as a member, according to the present invention. The general communication terminal receives a user's input to select a group to join or secede from in step 701. The group to be joined or seceded from should provide the user with an application function provided by the group in the general communication terminal requesting the joining. Then, the general communication terminal requests the central communication terminal to join or secede from the selected group (step 702). The central communication terminal makes the general communication terminal join or secede from the selected group and updates the group information shown in FIGS. 2 and 3 (step 703). After this, the central communication terminal transmits the updated group information to the general communication terminal (step 704). At this time, it is possible to transmit the updated group information to any other general communication terminal as well as the general communication terminal (step 705). The general communication terminal receiving the updated group information stores the updated group information in a group information database (step 706).

Figure 8:
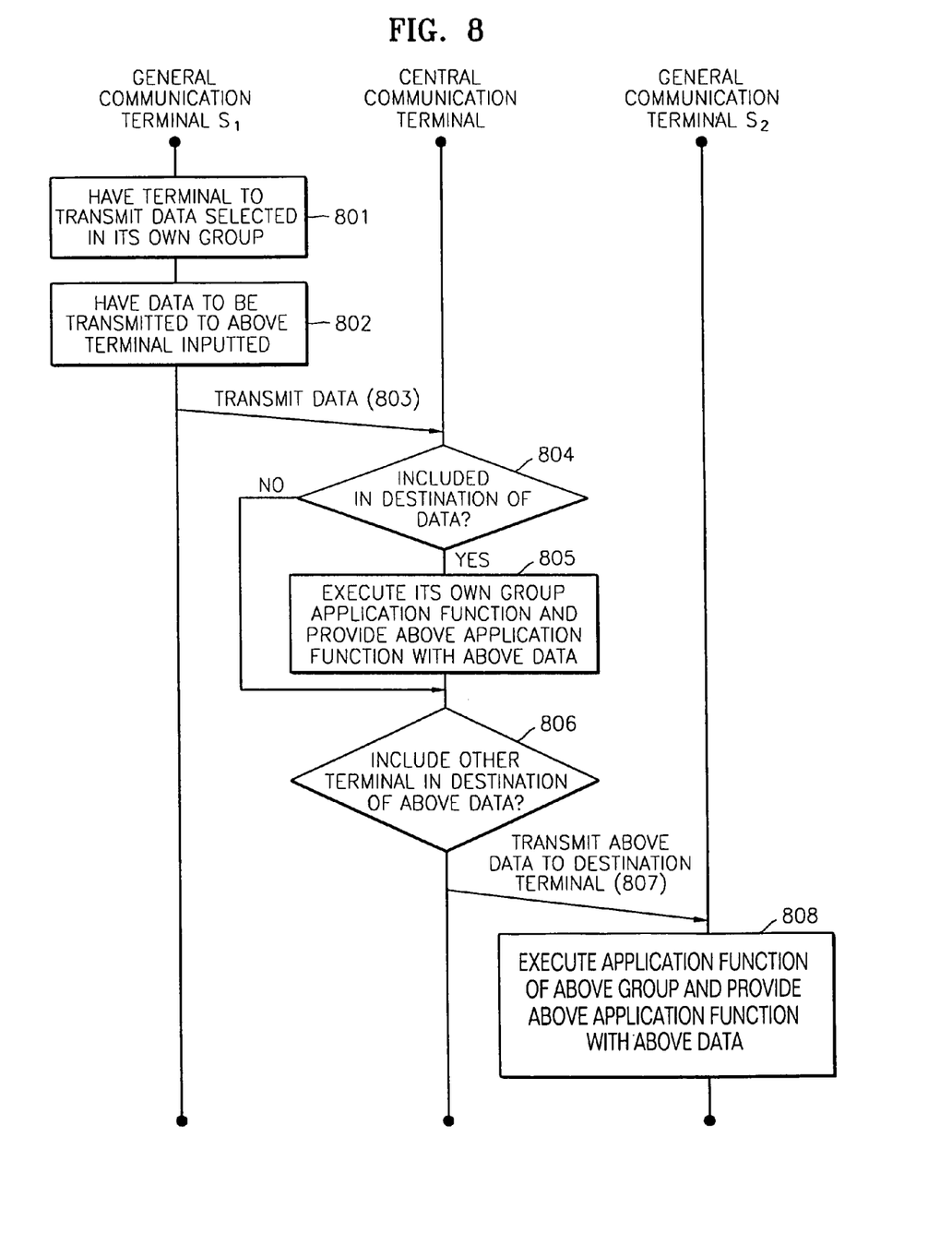
FIG. 8 is a view of a preferred embodiment of a process to transmit or receive data between terminals belonging to the same group, according to the present invention.

FIG. 8 shows a preferred embodiment of a process to transmit or receive data between terminals belonging to the same group, according to the present invention. A general communication terminal S1 to transmit data receives a user's selection of a communication terminal to receive transmitted data (step 801), in which the communication terminal to receive transmitted data belongs to the same group as the general communication terminal S1. Then, data is inputted to the selected communication terminal by the user (step 802). It is possible to proceed to step 802 before step 801, if necessary. The inputted data with information on the selected communication terminal are transmitted to the central communication terminal (step 803). The central communication terminal receiving the data determines if it is included in a destination to which the data is transmitted (step 804). If it is determined to be included in the destination, the central communication terminal executes an application function (an application process) provided by the group and provides the application function with the data (step 805). Then, the central communication terminal determines if any other communication terminal other than the central communication terminal is included in the destination (step 806). If any other communication terminal is included in the destination, the central communication terminal transmits the data to the other communication terminal which is included in the destination (step 807). The other communication terminal receives the data, executes the application function provided by the group, and provides the application function with the data (step 808).

In the meanwhile, in step 804, if the central communication terminal is not included in the destination, step 806 is performed after skipping step 805.

Figure 9:
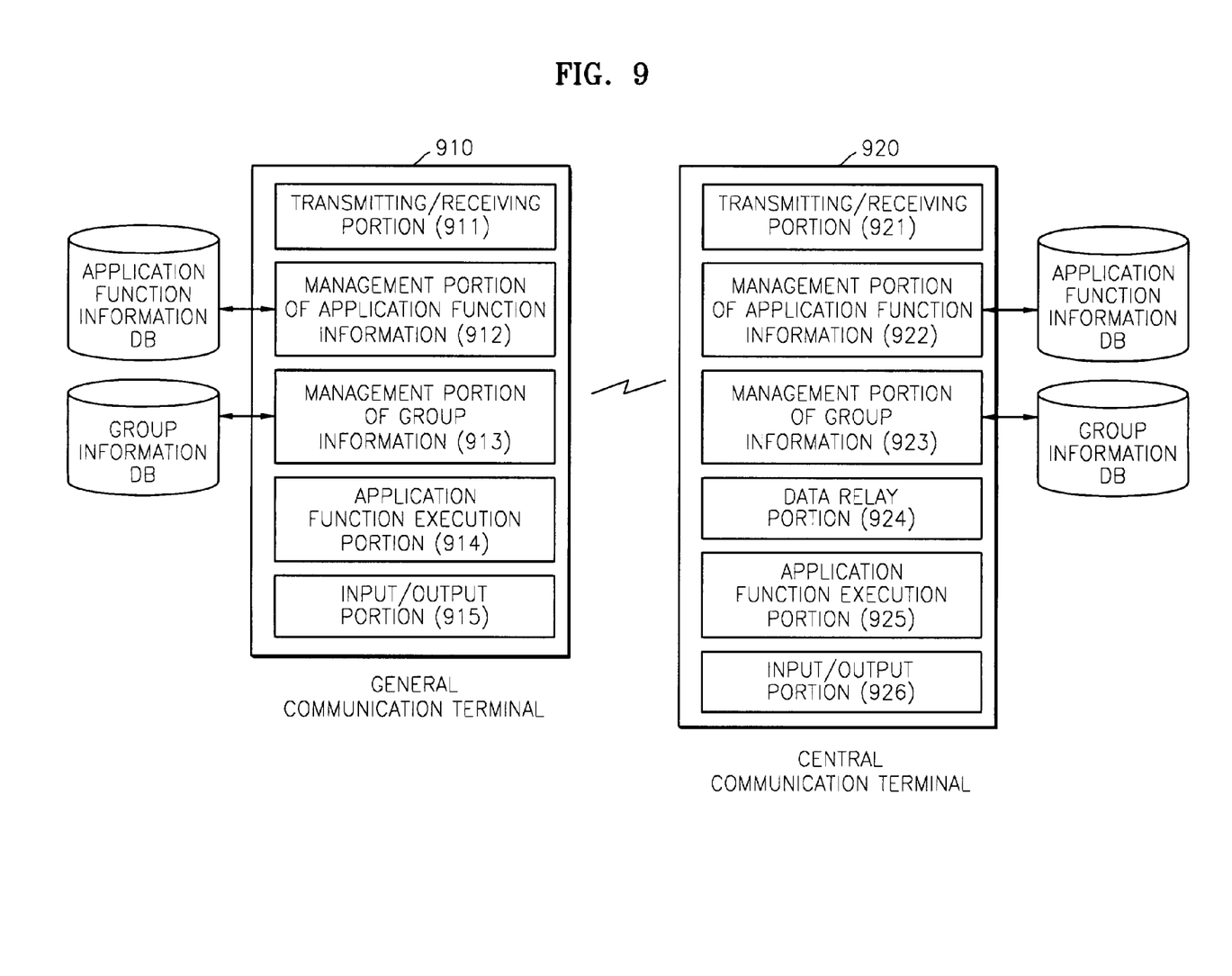
FIG. 9 is a view of a preferred embodiment of a functional structure of a communication terminal according to the present invention.

FIG. 9 shows a preferred embodiment of a functional structure of a communication terminal according to the present invention. A star network according to the present invention is made up of at least one general communication terminal 910 and a central communication terminal 920. The general communication terminal 910 comprises a transmitting/receiving portion 911, a management portion of application function information 912, a management portion of group information 913, an application function execution portion 914 and an input/output portion 915. The central communication terminal 920 comprises a transmitting/receiving portion 921, a management portion of application function information 922, a management portion of group information 923, a data relay portion 924, an application function execution portion 925, and an input/output portion 926.

The transmitting/receiving portion 911 of the general communication terminal 910 transmits or receives necessary information to and from the central communication terminal 920.

The management portion of application function information 912 of the general communication terminal stores an application function to be provided to a user by each communication terminal 910, in an application function information database.

The management portion of group information 913 of the general communication terminal 910 stores group information of each communication terminal, in a group information database.

The application function execution portion 914 of the general communication terminal 910 executes an application function provided to a user by the general communication terminal.

The input/output portion 915 of the general communication terminal 910 receives data transmitted from a user to another communication terminal and a destination communication terminal to receive the data, and provides the user with the data received from another communication terminal.

The transmitting/receiving portion 921 of the central communication terminal 920 transmits or receives necessary data from and to each general communication terminal 910.

The management portion of application function information 922 of the central communication terminal 920 stores an application function to be provided to a user by each communication terminal 910, in an application function information database.

The management portion of group information 923 of the central communication terminal 920 creates or disorganizes a group after receiving requests for creating or disorganizing a group from the general communication terminal and stores group information in a group information database. In addition, the management portion of group information 923 receives requests for joining or seceding from a group, from the general communication terminal, makes the general communication terminal join or secede from the group, updates the group information and stores the updated group information in a group information database.

The application function execution portion 925 of the central communication terminal 920 executes an application function provided to a user by the general communication terminal.

The input/output portion 926 of the central communication terminal 920 receives data to be transmitted from a user to another communication terminal and a destination communication terminal to receive the data, and provides the user with the data received from another communication terminal.

The data relay portion 924 of the central communication terminal 920 transmits data received from a general communication terminal to a destination communication terminal, if the destination communication terminal includes other communication terminals other than the central communication terminal 920.

The above described embodiments of the present invention may be embodied as computer readable programs, and stored in a computer readable medium.

The computer readable medium may include storage media such as magnetic storage media (e.g., ROMs, floppy disks, hard disks, etc.), optically readable media (e.g., CD-ROMs, DVDs, etc.) and carrier waves (e.g., transmission over the Internet).

According to the present invention, it is possible to create and manage a group of communication terminals based on each application function in a star network. In addition, communication between communication terminals in the same group can be performed smoothly.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for managing group information of a communication terminal in a star network made up of at least one general communication terminal and a central communication terminal controlling the whole network, the method comprising:

(a) requesting the central communication terminal to establish a communication channel for managing a group;

(b) having the communication channel established for managing the group by the central communication terminal, receiving group information of the group in which a predetermined terminal of the general communication terminal or another central communication terminal is included, and storing the group information;

(c) registering an application function of the communication terminal, providing a registered application information, and registering application information of other communication terminals provided by the central communication terminal; and (d) selecting another communication terminal providing the same application function as the application function of the communication terminal and requesting the central communication terminal to group the selected other communication terminal and the communication terminal.

2. The method of claim 1, wherein the method further comprises:

(e) receiving updated information from the central communication terminal updating the group information according to the grouping request and storing an updated information.

3. The method of claim 2, wherein the step of (d) comprises selecting a group which is included in the group information and requesting the central communication terminal to include the communication terminal in the selected group.

4. The method of claim 1, wherein the method further comprises:

(f) selecting a group wherein the communication terminal is included, based on the group information, and requesting the central communication terminal to eliminate the communication terminal from the selected group; and (g) receiving an updated group information from the central communication terminal updating the group information according to the elimination request.

5. The method of claim 4, wherein the step of (f) comprises requesting the central communication terminal to eliminate the group which includes the communication terminal, if the group information shows that the communication terminal is included in the group.

6. A method for managing group information of a central communication terminal in a star network made up of at least one general communication terminal and a central communication terminal controlling the whole network, the method comprising:

(a) receiving a request from the general communication terminal to establish a communication channel for managing a group;

(b) establishing the communication channel for managing the group and transmitting the group information stored by the central communication terminal to the general communication terminal;

(c) receiving information of an application function of the general communication terminal, from the general communication terminal, storing the application function information and transmitting an application function of other general communication terminals other than the general communication terminal, to the general communication terminal; and (d) receiving a request to group together the central communication terminal and another communication terminal selected by the general communication terminal, grouping the general communication and the other communication terminal and updating the group information, wherein if the other communication terminal receives data from the general communication terminal, the other communication terminal executes an application function characterizing the group.

7. The method of claim 6, wherein the method further comprises:

(e) transmitting an updated group information to the general communication terminal and the other communication terminal.

8. The method of claim 7, wherein the step of (d) comprises grouping the general communication terminal and the other communication terminal and updating the group information only when the application function of the general communication terminal is the same as the application function of the other communication terminal.

9. The method of claim 7, wherein the step of (d) comprises by receiving a request to include the general communication terminal in a group of the group information and updating the group information according to the including request.

10. The method of claim 7, wherein the method further comprises:

(f) receiving a request to secede from a predetermined group, from a communication terminal; and (g) updating the group information according to the seceding request and transmitting an updated group information to the communication terminal.

11. The method of claim 10, wherein the step of (f) comprises receiving a request to disorganize a predetermined group which includes a communication terminal, from the communication terminal, updating the group information according to the request to disorganize and transmitting an updated group information to the communication terminal.

12. A communication method for a star network made up of at least one general communication terminal and a central communication terminal controlling the whole network, the communication method comprising:

(a) receiving group information from the central communication terminal and storing the received group information;

(b) selecting at least one communication terminal of other communication terminals which are included in a same group, from the group information, and transmitting data to the selected communication terminal;

(c) the communication terminal which receives the data from the general communication terminal, determining if its own terminal is included in a destination of the data; and (d) if the communication terminal is determined to be included in the destination, the communication terminal, executing a predetermined application function characterizing the group to process the data and providing the executed application function with the data.

13. The communication method of claim 12, wherein the step of (c) further comprises:

(c1) the central communication terminal which receives the data, extracting information of a communication terminal to be a destination receiving the data; and (c2) if another communication terminal other than the central communication terminal is included in the extracted information on the communication terminal, the central communication terminal re-transmitting the data to the other communication terminal.

14. A communication terminal comprising:

a transmitting/receiving portion which transmits or receives necessary information to and from other communication terminals;

a management portion of an application function information which registers application information which the communication terminal can provide, receives through the transmitting/receiving portion and stores an application function to be provided by the other communication terminals;

a management portion of group information which creates, receives through the transmitting/receiving portion and stores information on a predetermined group of predetermined communication terminals;

an application function execution portion which receives data from the same group as the communication terminal and executes an application program which provides an application function characterizing the group; and an input/output portion which provides the received data by indicating the data and has necessary information inputted.

15. The communication terminal of claim 14, wherein the communication terminal further comprises a data relay portion which re-transmits data received from a predetermined communication terminal, to other communication terminals, if a destination includes the other communication terminals.

16. A computer-readable recording storage medium for recording a computer program code for enabling a computer to provide a service of managing group information of a communication terminal in a star network made up of at least one general communication terminal and a central communication terminal controlling the whole network, the service comprising the steps of:

(a) requesting the central communication terminal to establish a communication channel for managing a group;

(b) having the communication channel established for managing the group by the central communication terminal, receiving group information of the group in which a predetermined terminal of the general communication terminal or another central communication terminal is included, and storing the group information;

(c) registering an application function which can be provided by the communication terminal, providing a registered application information, and registering application information of other communication terminals provided by the central communication terminal; and (d) selecting another communication terminal providing the same application function as the application function of the communication terminal and requesting the central communication terminal to group the selected other communication terminal and the communication terminal.

17. The computer-readable recording storage medium of claim 16, wherein the service further comprises the steps of:
(e) receiving updated information from the central communication terminal updating the group information according to the grouping request and storing an updated information.

18. The computer-readable recording storage medium of claim 17, wherein the step of (d) comprises selecting a group which is included in the group information and requesting the central communication terminal to include the communication terminal in the selected group.

19. The computer-readable recording storage medium of claim 17, wherein the service further comprises the steps of:
(f) selecting a group wherein the communication terminal is included, based on the group information, and requesting the central communication terminal to eliminate the communication terminal from the selected group; and
(g) receiving an updated group information from the central communication terminal updating the group information according to the elimination request.

20. The computer-readable recording storage medium of claim 19, wherein the step of (f) comprises requesting the central communication terminal to eliminate a the group which includes the communication terminal, if the group information shows that the communication terminal is included in the group.

21. A computer-readable recording storage medium for recording a computer program code for enabling a computer to provide a service of managing group information of a central communication terminal in a star network made up of at least one general communication terminal and a central communication terminal controlling the whole network, the service comprising the steps of:
(a) receiving a request from the general communication terminal to establish a communication channel for managing a group;
(b) establishing the communication channel for managing the group and transmitting the group information stored by the central communication terminal to the general communication terminal;
(c) receiving information of an application function which can be provided by the central communication terminal, from the general communication terminal, storing the application function information and transmitting an application function of other general communication terminals other than the general communication terminal, to the general communication terminal; and
(d) receiving a request to group together the central communication terminal and another communication terminal selected by the general communication terminal, grouping the general communication and the other communication terminal and updating the group information,
wherein if the other communication terminal receives data from the general communication terminal, the other communication terminal executes an application function characterizing the group.

22. The computer-readable recording storage medium of claim 21, wherein the service further comprises the steps of:
(e) transmitting an updated group information to the general communication terminal and the other communication terminal.

23. The computer-readable recording storage medium of claim 22, wherein the step of (d) comprises grouping the general communication terminal and the other communication terminal and updating the group information only when the application function of the general communication terminal is the same as the application function of the other communication terminal.

24. The computer-readable recording storage medium of claim 22, wherein the step of (d) comprises receiving a request to include the general communication terminal in a group of the group information and updating the group information according to the including request.

25. The computer-readable recording storage medium of claim 22, wherein the service further comprises the steps of:
(f) receiving a request to secede from a predetermined group from a communication terminal; and
(g) updating the group information according to the seceding request and transmitting an updated group information to the communication terminal.

26. The computer-readable recording storage medium of claim 25, wherein the step of (f) comprises receiving a request to disorganize a predetermined group which includes a communication terminal, from the communication terminal, updating the group information according to the request to disorganize and transmitting an updated group information to the communication terminal.

27. A computer-readable recording storage medium for recording a computer program code for enabling a computer to provide a service for a star network made up of at least one general communication terminal and a central communication terminal controlling the whole network, the service comprising the steps of:
(a) receiving group information from the central communication terminal and storing the received group information;
(b) selecting at least one communication terminal of other communication terminals which are included in a same group, from the group information, and transmitting data to the selected communication terminal;
(c) the communication terminal which receives the data from the general communication terminal, determining if its own terminal is included in a destination of the data; and
(d) if the communication terminal is determined to be included in the destination, the communication terminal, executing a predetermined application function characterizing the group to process the data and providing the executed application function with the data.

28. The computer-readable recording storage medium of claim 27, wherein the step of (c) further comprises:
(c1) the central communication terminal which receives the data, extracting information of a communication terminal to be a destination receiving the data; and
(c2) if another communication terminal other than the central communication terminal is included in the extracted information on the communication terminal, the central communication terminal, re-transmitting the data to the other communication terminal.

29. A computer-readable recording storage medium having recorded thereon a program, which when executed by a computer causes the computer to execute a method for transmitting data in a star network, the method comprising:
(a) receiving group information at a general communication terminal from a central communication terminal and storing the received group information;
(b) selecting at least one communication terminal of other communication terminals which are included in a same group, from the group information, and transmitting data to the selected communication terminal;

(c) the communication terminal which receives the data from the general communication terminal, determining if its own terminal is included in a destination of the data; and
(d) if the communication terminal is determined to be included in the destination, the communication terminal, executing a predetermined application function characterizing the group to process the data and providing the executed application function with the data, wherein the data includes a group identity code information for identifying a group of a communication terminal which makes up least one star network, by a member of the group; an application function code information for identifying an application function which is commonly provided to a user by the communication terminal making up the group; and a data field for application function pointer information on an execution pointer of an application function to execute an application process which provides the application function for each communication terminal.

* * * * *